United States Patent [19]
Olesen

[11] Patent Number: 4,669,929
[45] Date of Patent: Jun. 2, 1987

[54] JOIST DRILL

[76] Inventor: Karl R. Olesen, 2250 N. Forbes, Suite 101, Tucson, Ariz. 85745

[21] Appl. No.: 818,122

[22] Filed: Jan. 10, 1986

[51] Int. Cl.[4] .......................... B23B 41/00; B23B 45/14

[52] U.S. Cl. .................................... 408/100; 144/108; 408/87; 408/95; 408/103

[58] Field of Search ........................ 408/65, 87, 95, 99, 408/100, 103, 104, 115 R, 97; 144/108

[56] References Cited

U.S. PATENT DOCUMENTS

| | | | |
|---|---|---|---|
| 704,657 | 7/1902 | McClellan | 408/95 |
| 907,883 | 12/1908 | Rhinehart | 408/95 |
| 2,462,979 | 3/1949 | Liebau | 408/100 |
| 2,625,063 | 1/1953 | Hanson | 77/59 |
| 2,763,299 | 9/1956 | Cerf, Jr. | 408/115 R X |
| 2,925,001 | 2/1960 | Johnson | 408/712 X |
| 3,060,769 | 10/1962 | Heider | 408/99 X |
| 3,327,573 | 6/1967 | Prussiano | 408/115 R |
| 3,362,447 | 1/1968 | Elder, Jr. | 144/104 |
| 3,967,687 | 7/1976 | Fowler | 408/99 X |
| 4,010,943 | 3/1977 | Eft | 269/87.1 |
| 4,235,565 | 11/1980 | Albano | 408/99 |
| 4,540,319 | 9/1985 | Michiharu | 408/100 |

*Primary Examiner*—Gil Weidenfeld
*Assistant Examiner*—Steven C. Bishop
*Attorney, Agent, or Firm*—Cahill, Sutton & Thomas

[57] ABSTRACT

A drilling apparatus especially useful in drilling holes in wooden joists and studs, through which plumbing and electrical cables are to be routed, includes a bracket for engaging a joist or stud and a movable carriage supporting an electric motor and drill bit. A lever mechanism moves the carriage, and hence the motor and drill bit forcibly toward the bracket, forcing the drill bit through the joist. Countertorque from the drill bit is resisted by the coaction of the bracket and the drill bit in the hole being drilled. This avoids possible loss of balance by the operator.

7 Claims, 13 Drawing Figures

FIG. 1
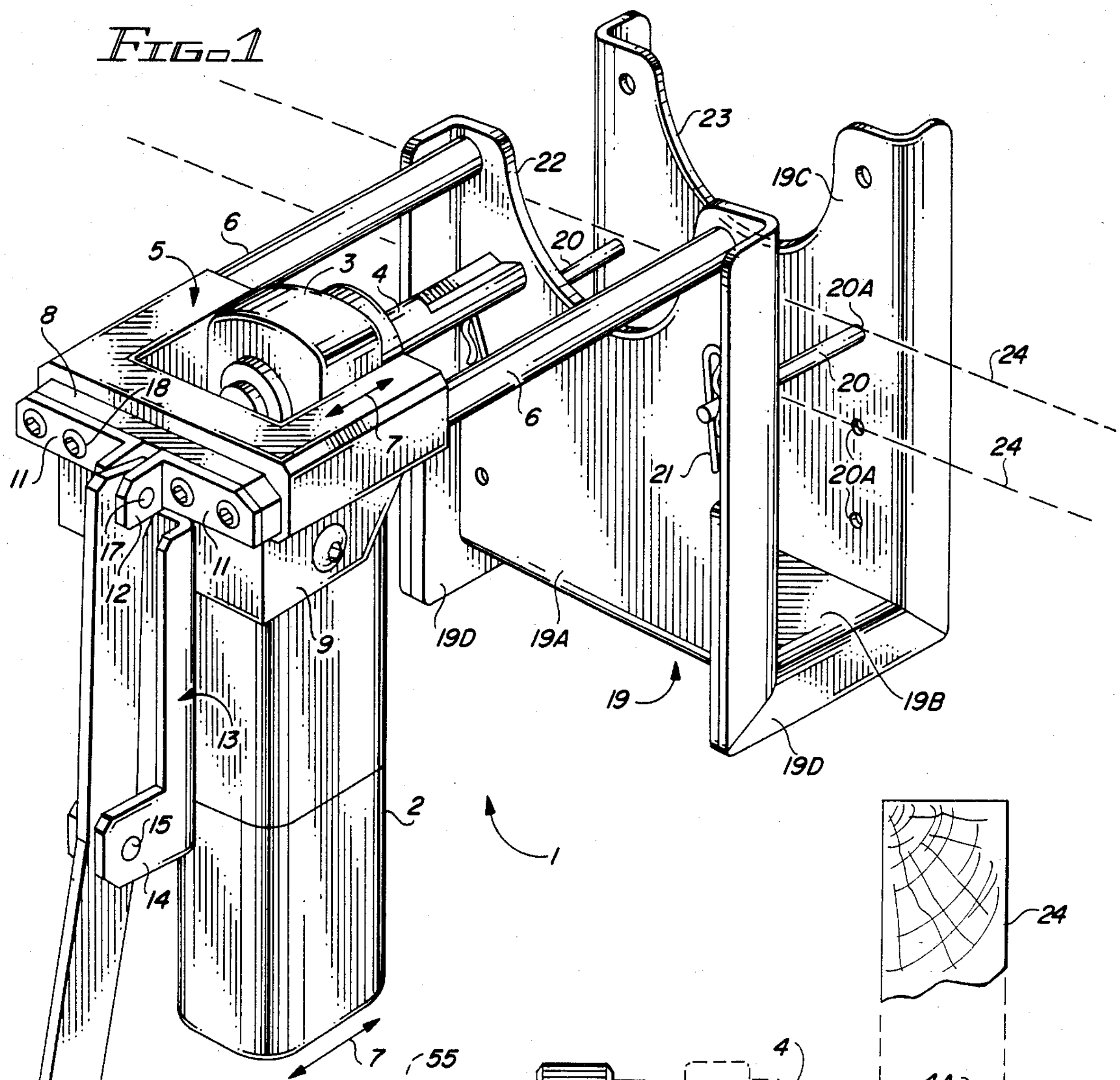
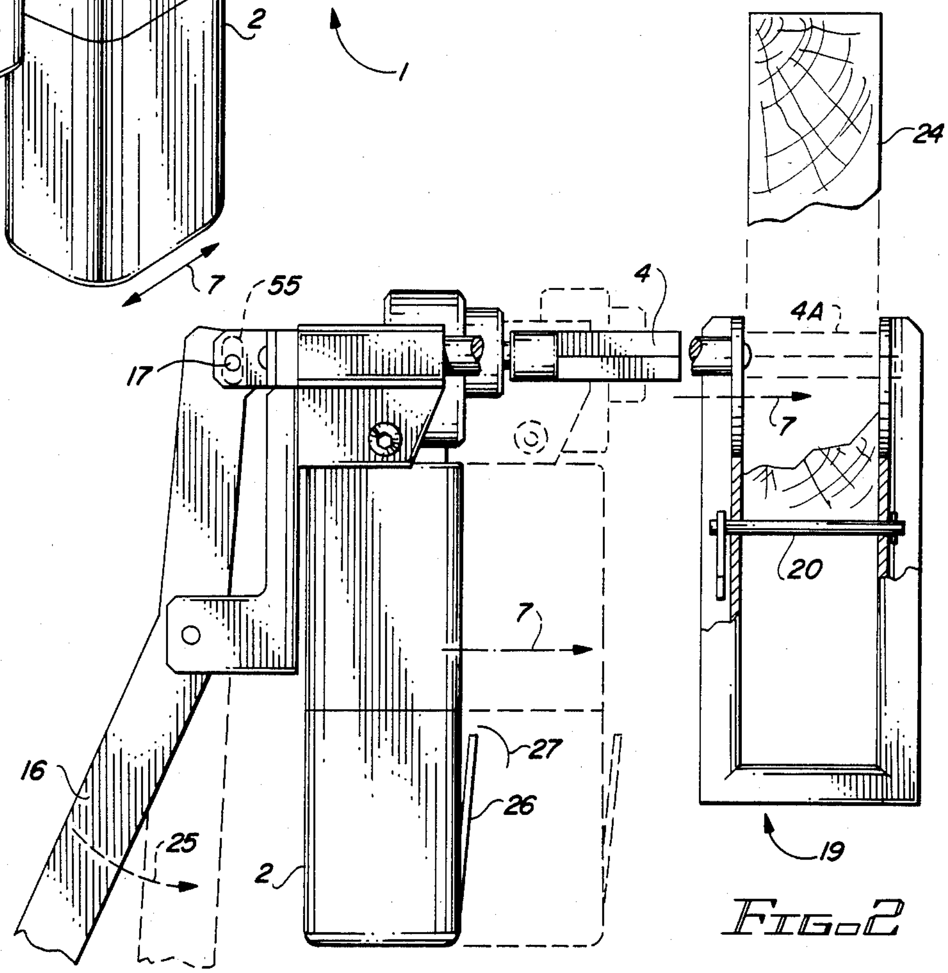
FIG. 2

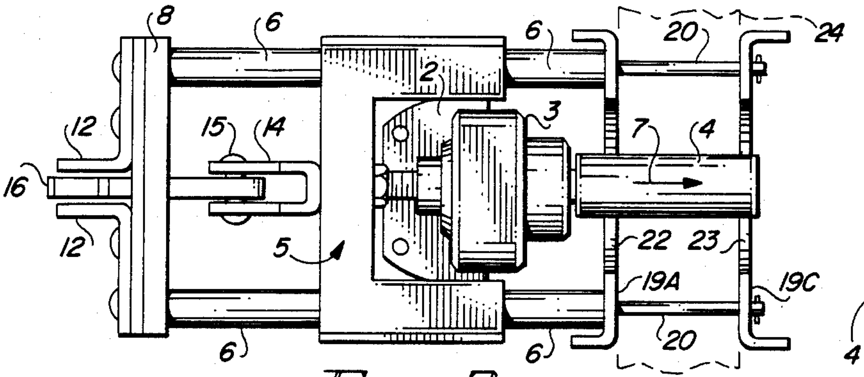
FIG. 3
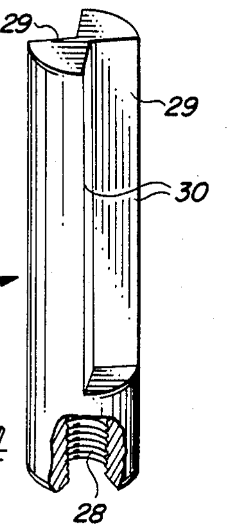
FIG. 4
FIG. 5
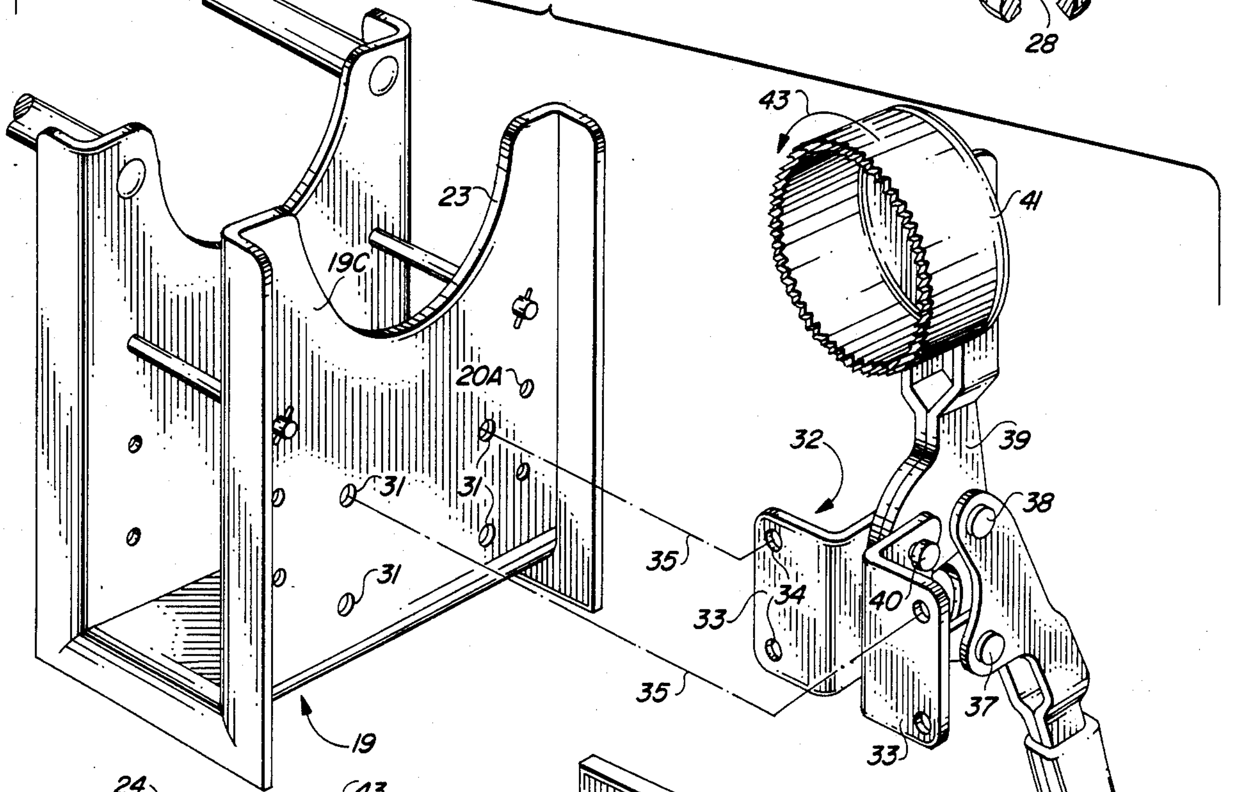
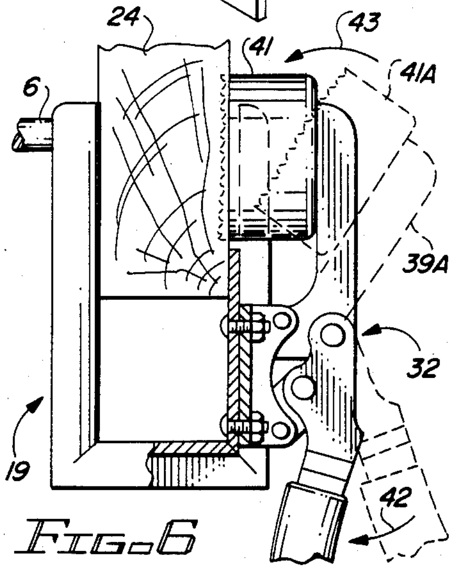
FIG. 6
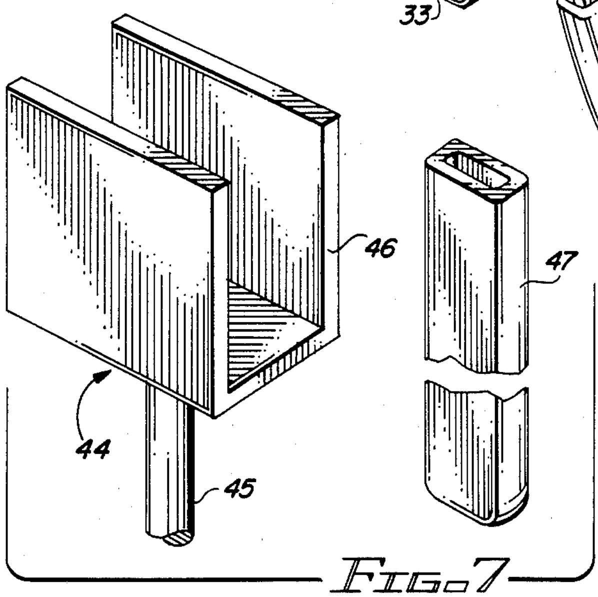
FIG. 7

JOIST DRILL

BACKGROUND OF THE INVENTION

The invention relates to drilling apparatus, and more particularly to drilling apparatus especially adapted for drilling holes in studs and joists through which to route wire and plumbing without exerting countertorque on a handle of the drilling apparatus.

In the constructing of buildings, a frame often is constructed of wooden wall studs, floor joists, and rafter assemblies. Electrical wiring and plumbing often is later routed through the joists and/or studs, so after assembly of the frame, holes must be drilled in the various joists and studs to allow such routing of electrical wiring and plumbing. In the past, such holes have been drilled by workers using large, powerful hand-held electric drills that typically have motors of a horsepower or more. Such drills generate a great deal of torque during drilling of the holes. The drill bits utilized often are large, sometimes over an inch in diameter. The drilling usually needs to be accomplished as rapidly as possible. Therefore, the drill operator apply a great deal of force to the electrical drill to cause it to bore rapidly through the studs or joists. The high torque produced by the powerful motor and applied to the drill bits produces an equal countertorque on the handle of the drill being held by the operator. Such countertorque occassionally causes the operator to lose balance, sometimes causing loss of control of the drill and sometimes causing injury to the worker, especially if he happens to be standing on a ladder or scaffolding as he performs the drilling operation. As the drill bits become dull, the worker may experience considerable difficulty in applying enough force on the drill to accomplish the drilling as rapidly as desired. In such circumstances, workers sometimes use one hand to operate the drill and use their other hands to reach around to the back side of the joist or stud being drilled in order to brace themselves to apply more force to the drill. This practice has resulted in severe injuries to workers. Such an injury may occur if the drill bit unexpectedly "punches through" the joist and cuts into the operator's hand. Another problem encountered by workers attempting to drill wire and plumbing routing holes is that joists frequently are spaced along 16 inch centers. The drill bits utilized frequently are quite long, and, in combination with the length of the electric drill being used, cannot be fit in the spacings between the joists. Consequently, the operator must incline the drill bits and drill holes move perpendicularly through the joists. The non-perpendicular holes may cause difficulty later during pulling the electrical wiring and/or plumbing through the routing holes.

Thus, it can be seen that there is a need for an improved device that allows workers to safely, rapidly, and accurately drill plumbing and electrical cable routing holes through wooden studs and joists.

SUMMARY OF THE INVENTION

Accordingly, it is an object of the invention to provide an improved apparatus for drilling electrical wire and plumbing routing holes through wooden joists and studs with greater accuracy and less effort than has been the case for prior drilling apparatus.

It is another object of the invention to provide an improved joist and stud drilling apparatus that avoids safety hazards caused by countertorque produced on handles of prior drilling apparatus.

Briefly described, and in accordance with one embodiment thereof, the invention provides a drilling apparatus including a bracket for engaging a joist or stud to be drilled, a carriage mechanism rigidly attached to the bracket and supporting an electric drill, and a mechanism for urging a bit of the electric drill to move into and through the portion of the joist engaged by the bracket, whereby coaction between the drill bit, the partially drilled hole, and the engagement of the joist or stud by the bracket resists countertorque produced on the carriage as a result of the drilling so that such countertorque is not applied to the handle of the drilling apparatus. In the described embodiment of the invention, the bracket includes a U-shaped channel to which a pair of straight guide rods are rigidly attached. A movable carriage is supported by the guide rods by means of a pair of linear bearings. An electric motor attached to a right angle drive mechanism produces rotation of a bit parallel to the guide rods. A lever handle connected to the carriage and to an end plate attached to the outer ends of the guide rods forces the carriage, motor, and drill bit along the guide rods as the lever handle is actuated by a worker. To operate the drilling apparatus, the worker merely positions the U-shaped channel to "bracket" the joist or stud to be drilled, so that two spaced points of the U-shaped channel abut an edge of the joist. The worker then actuates the lever handle by forcing it to move forward. Rotation of the U-shaped channel, and hence rotation of the entire drilling apparatus, in response to countertorque produced by the drilling is resisted because the drill bit can move only axially in the partially drilled hole. In one described embodiment of the invention, a lever-actuated clamping mechanism securely clamps the U-shaped channel bracket to the joist before the actuating of the lever handle. In another embodiment of the invention, extension handles are provided to support the U-shaped channel and to extend the lever handle so that the device can be utilized to drill routing holes in overhead joists without use of a ladder by the operator.

BRIEF DESCRIPTION OF THE DRAWINGS

FIG. 1 is a perspective view of one embodiment of the present invention.

FIG. 2 is a partial side elevational view of the drilling apparatus shown in FIG. 1.

FIG. 3 is a top view of the drilling device of FIG. 1.

FIG. 4 is a partial cutaway perspective view of the cutting bit shown in FIG. 1.

FIG. 5 is a partial exploded perspective view showing a clamping device in accordance with an alternate embodiment of the invention.

FIG. 6 is a partial cutaway section view illustrating use of the clamping device shown in FIG. 5.

FIG. 7 is a partial perspective view of a pair of extension handles useful in using the device of FIG. 1 to drill routing holes in high overhead joists.

DESCRIPTION OF THE INVENTION

Figure 8A:
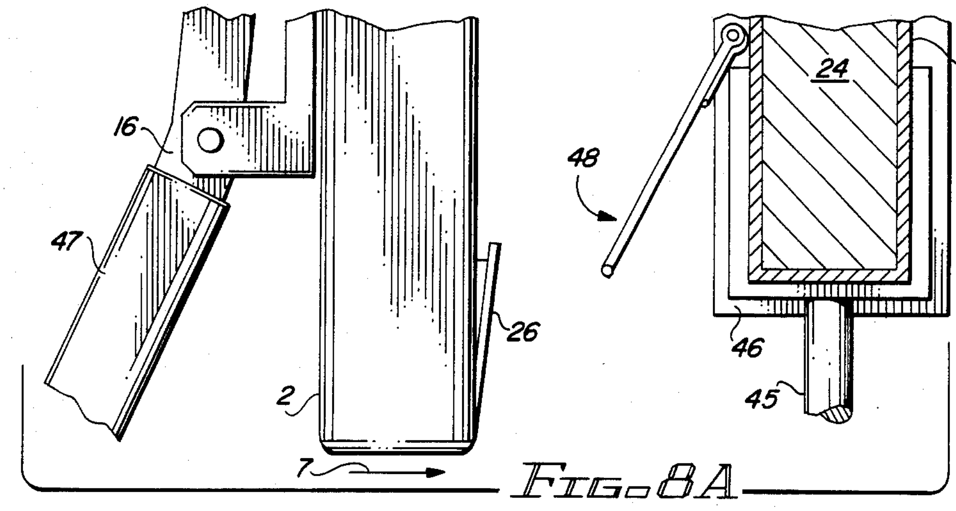
FIG. 8A is a partial elevation view illustrating a switching mechanism that can be utilized in conjunction with the device of FIG. 7.

Referring now to the drawings, particularly FIGS. 1–4, joist drilling apparatus 1 includes an elongated electric motor 2 having a vertical rotary shaft (not shown) connected to a right angle drive mechanism 3. A drill bit 4 is attached to the output shaft of right angle drive 3. The motor 2 and right angle drive 3 can be purchased as a disc sander unit from various companies, including Black & Decker.

Electric motor 2 and right angle drive 3 are supported on a horizontally movable carriage 5. Carriage 5 includes a bracket 9 which surrounds the upper portion of the housing of motor 2, and is suitably attached thereto. Carriage 5 moves in the direction of arrows 7 along a pair of straight guide rods 6. Guide rods 6 are precisely parallel, and pass through a pair of spaced parallel bushings inside of carriage 5 to form a linear bearing. Guide rods 6 are rigidly attached at their right-hand ends to an outer face of a joist bracket 19.

Joist bracket 19 includes a metal U-shaped channel including opposed spaced vertical plates 19A and 19C joined at the bottom by a horizontal plate 19B. A pair of outwardly oriented flanges 19D attached to the ends of the U-shaped channel 19 provide structural rigidity to the U-shaped channel 19. Dotted lines 24 represent the bottom edges of a horizontal joist into which a wire routing hole or a plumbing hole is to be drilled. In FIG. 2, reference numeral 24 designates a section view of the joist. A pair of adjustable stops 20 extend through precisely located holes in directly opposed portions of plates 19A and 19C to abut the bottom edge of joist 24, as better seen in FIG. 2. Cotter pins such as 21 can be utilized to retain the depth adjustment pins 20 in holes of the U-shaped channel bracket 19.

The extreme right-hand ends of guide rods 6 are attached by a pair of set screws to an end plate 8. A pair of brackets 11 each having tabs 12 are attached to the outer face of plate 8. A lever handle 16 has its upper end journaled between ears or tabs 12 by means of a pivot pin 17, so that the upper end of lever handle 16 is held in fixed pivotal relationship to the outer ends of guide rods 6, and hence is stationary with respect to U-shaped channel bracket 19.

An L-shaped bracket 13 is rigidly connected at its upper end to motor support 9 of movable carriage 5. The lower part of L-shaped bracket 13 has a pair of tabs 14 between which an intermediate portion of lever handle 16 is journaled by means of pivot pin 15.

Thus, it can be easily seen that pivoting of handle 16 in the directions of arrows 25 causes carriage 5, drill bit 4, and motor 2 to move in the direction of arrows 7, enabling the drill bit to be forced into joist 24, drilling a routing hole therein. The upper pivot pin 17 extends through an elongated hole 55 in the upper end of lever handle 16 to prevent the linkage from binding.

The details of drill bit 4 are shown in FIG. 4, wherein a threaded end 28 receives a correspondingly threaded shank provided on the output shaft of right angle drive 3. Although a wide variety of drill bits or rotary cutting buts can be utilized, the one shown in FIG. 4, having a pair of opposed longitudinal V-grooves 29 forming sharp edges 30, has been found to be very satisfactory for drilling routing holes and for "hogging out" larger portions of the joist or stud by gouging out a path between closely spaced, previously drilled holes. Circular saw bits of the type commonly used to cut circular holes in which to install door knobs also can be utilized.

Referring now to FIG. 5, plate 19C has four holes 31 aligned with four holes 34 of an auxiliary clamping apparatus 32. Clamping apparatus 32 can be provided as an option to enable the user to first securely clamp the joist bracket 19 to joist 24 before the lever handle 16 is actuated to drill a routing hole in the joist. Clamping apparatus 32 includes a handle 36 and a clamping arm 39 that is pivotally attached to a pair of right angle brackets 33, which are clamped by means of bolts (not shown) extending through the holes 31 and 34. Handle 36 has an upper end connected by a pivot pin 38 to an outer portion of arm 39. An inner portion of arm 39 is pivotally connected by pivot pin 40 between ears of brackets 33. An intermediate portion of handle 36 is pivotally connected by pivot pin 37 between the tabs of brackets 33. A clamping element 41, which may have any desired configuration that can pass through the cutouts 23 of vertical plate 19C, is attached to the outer end of arm 39 and engages the outer wall of the joist when handle 36 is actuated. Movement of handle 36 in the direction of area 42 causes the clamping element 41 to move in the direction of arrow 43, clamping the joist.

As best shown in FIG. 6, movement of handle 16 to its left-most position causes teeth of clamping element 41 to move from the location indicated by dotted line 41A to the position shown in FIG. 6, wherein the teeth dig into the outer face of joist 24. The entire U-shaped joist bracket 19, and hence the entire drilling apparatus, then is rigidly clamped to the joist. The operator then need only actuate the lever handle 16 to force drill bit 4 into joist 24.

Referring now to FIG. 7, extension device 44 can be provided, having a long handle 45 and a U-shaped channel 46. Channel 46 can be slid around the joist bracket 19, as shown in FIG. 8A, so that a user standing on a floor can support and raise the entire drilling apparatus 1 up toward an overhead joist and position the U-shaped joist bracket 19 about the joist 24 as shown in FIGS. 1 and 2. A handle extension 47 is slipped over the lower end of lever handle 16. The user, standing on the floor, then can accurately and safely drill a routing hole in the overhead joist without standing on a ladder or scaffolding.

Figure 9:
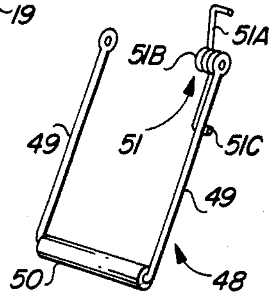
FIG. 9 is an enlarged perspective view of the switching device shown in FIG. 8A.
Figure 8B:
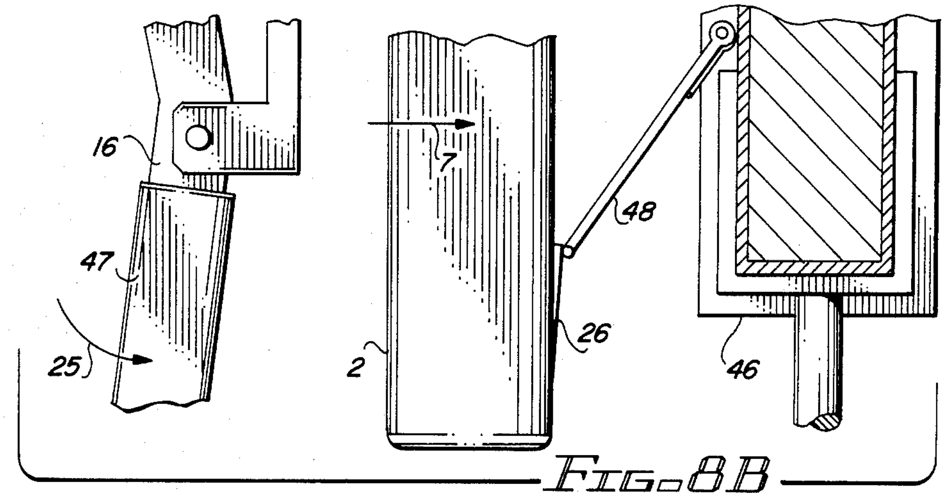
FIG. 8B is a partial side view useful in describing the operation of the device shown in FIG. 8A.

In FIG. 2, it can be seen that the motor 2 has a momentary power switch 26 then must be depressed in the direction of arrow 27 to turn on the motor. If the extension handles of FIG. 7 are utilized, and if the motor does not have a power switch lock, then it is necessary to provide an apparatus to depress power switch 26 when handle 16 is actuated. Reference numeral 48 designates a device, shown in a perspective view in FIG. 9, which is attached to the outer surface of the U-shaped channel 46 of extension support 44. Device 48 includes a pair of opposed parallel arms 49 connected pivotally at their upper ends to U-shaped channel 46 and supporting a roller 50 at their lower ends. Roller 50 engages power switch 26, as shown in FIG. 8B. A spring element 51 includes an upper section 51A that engages the surface of U-shaped channel 46, a central coil portion 51B, and a lower portion 51C that urges arms 49 outward away from the surface of U-shaped channel 46. When lever handle 16 is actuated in the direction of arrow 25 (FIG.

Figure 8C:
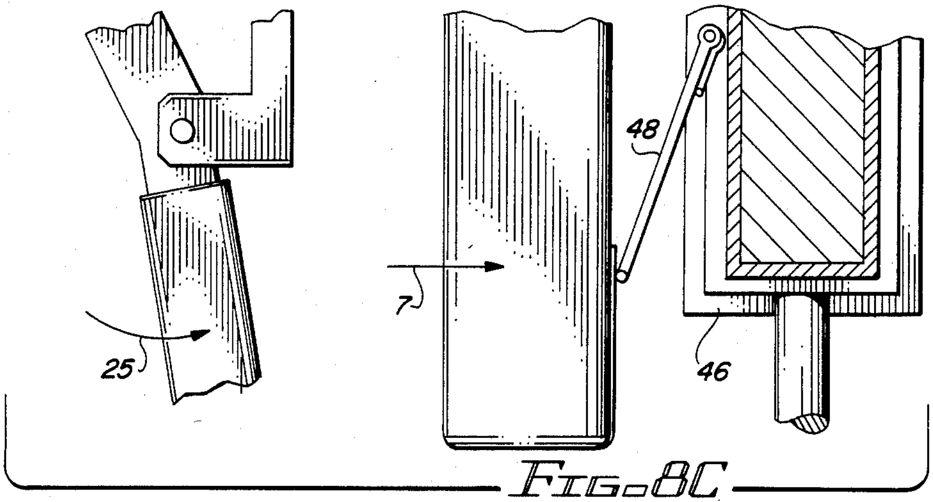
FIG. 8C is another side view useful in explaining the operation of the device shown in FIG. 8A.

8B), thereby moving motor 2, carriage 5, and drill bit 4 toward the joist bracket 19, roller 50 engages power switch 26, and depresses it, as shown in FIGS. 8B and 8C.

Figure 10:
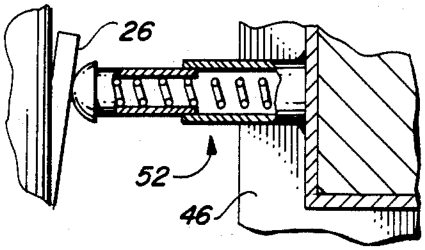
FIG. 10 is a partial cutaway view showing another switching device that can be used in conjunction with the device shown in FIG. 7.
Figure 11:
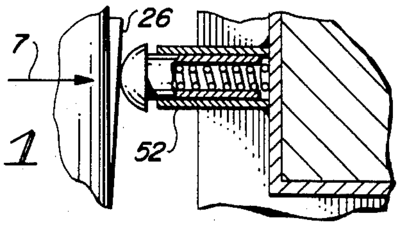
FIG. 11 is a partial cutaway section view useful in explaining the operation of the device shown in FIG. 10.

A similar device, utilizing a spring loaded telescoping device 52 anchored to the outer surface of U-shaped channel 46, is shown in FIGS. 10 and 11. Operation is essentially the same, in that the power switch 26 is depressed when carriage 5 moves toward the joist bracket 19.

The operation of the above-described embodiments of the invention is straightforward. An operator simply needs to set the desired distance of the routing holes from an edge of the joist by adjusting the locations of stop pins 20 by positioning them in the appropriate holes 21A (FIG. 1). The worker then simply positions the joist bracket 19 about the joist or stud to be drilled, so that the two pins 20 abut the edge of the joist or stud. The worker forces the lower end of the lever handle 16 toward the U-shaped joist bracket 19. Usually, the worker will utilize one hand to actuate lever handle 16 and the other hand to grasp the joist bracket 19 or the body of motor 2, actuating the switch 26. It can easily be seen that countertorque produced in reaction to torque applied to bit 4 as the routing hole is being drilled is completely resisted by the coaction between the drill bit 4 and the stop pins 20. The countertorque attempts to rotate motor 2 about the longitudinal axis of drill bit 4. Carriage 5 and guide rods 6 attempt to rotate the joist housing 19, but the drill bit 4 cannot move transversely in the hole being drilled. Consequently, no countertorque is applied to the handle 16.

Furthermore, there is no need whatever for the operator to reach around to the opposite side of the joist being drilled in order to face himself so that he can apply enough force to the lever handle 16, since he can easily grasp the bottom of the U-shaped joist bracket 19. For situations in which it may be difficult to maintain the position of the drilling apparatus 1 of FIG. 1, the clamping mechanism of FIG. 5 can be provided to rigidly anchor the joist bracket 19 to the joist or stud to be drilled. Finally, the extension apparatus shown in FIG. 7 enables routing holes to be drilled in overhead joist by a worker standing on the floor, without use of stepladders.

While the invention has been described with reference to several embodiments thereof, those skilled in the art will be able to make various modifications to the described embodiments of the invention without departing from the true spirit and scope thereof. For example, if a sufficiently compact motor is available, a straight drive, rather than a right angle drive can be used. The drive could even be connected by a flexible drive cable to a separate motor.

I claim:

1. A drilling apparatus for drilling a wooden member having first and second opposed major faces and an edge face, the apparatus comprising in combination:

(a) means for engaging the first major face and the edge face of the wooden member;

(b) a drilling element;

(c) a motor and a drive mechanism coupling the motor to rotate the drilling element; and (d) means for supporting the motor and drive mechanism in moving relationship to the wooden engaging means and forcing the drilling bit into the second major face and through the wooden member, the supporting means includes a linear bearing assembly including a first straight rod rigidly attached to the wooden member engaging means and a carriage slidably disposed on the first straight rod and attached to the drive mechanism;

(e) means connected to the first straight rod and the carriage for forcing the carriage to move along the first straight rod, wherein the forcing means includes a lever handle pivotally connected to the first straight rod and to the carriage member, wherein the lever handle includes an end portion pivotally connected to an end of the first straight rod and an intermediate portion pivotally connected to the carriage, and also includes an elongated handle section disposed to receive a force applied in the direction of the axis of the drilling element, whereby the drilling element and the wooden member engaging means coact to prevent countertorque produced by the drilling element from causing the drilling apparatus to rotate relative to the wooden member.

2. The drilling apparatus of claim 1 wherein the supporting means includes means for limiting movement of the drive mechanism to a direction perpendicular to the second major face of the wooden member.

3. The drilling apparatus of claim 1 wherein the drive mechanism is a right angle drive mechanism.

4. The drilling apparatus of claim 2 wherein the linear bearing assembly includes a second straight rod attached to the wooden member engaging means and the end portion of the lever handle, the carriage being slidably disposed on the second straight rod.

5. The drilling apparatus of claim 4 wherein the wooden member engaging means includes a U-shaped channel member having parallel first and second sides, the first side being rigidly attached to the first and second straight rods, the distance between the first and second sides of the U-shaped channel member being slightly greater than the thickness of the wooden member, the first and second sides each defining a cutaway area through which the drilling element extends as it drills through the wooden member.

6. The drilling apparatus of claim 5 including clamping means attached to the second side of the U-shaped channel member for rigidly clamping the U-shaped channel member to the wooden member.

7. The drilling apparatus of claim 6 including a first extension member for attachment to the U-shaped channel member to raise the drilling apparatus and to position the U-shaped channel member about an elevated overhead wooden member, the drilling apparatus also including a second extension member for attachment to the handle section of the lever to allow an operator to actuate the lever while supporting the raised drilling apparatus by means of the first extension member.

* * * * *